United States Patent Office 2,811,214
Patented Oct. 29, 1957

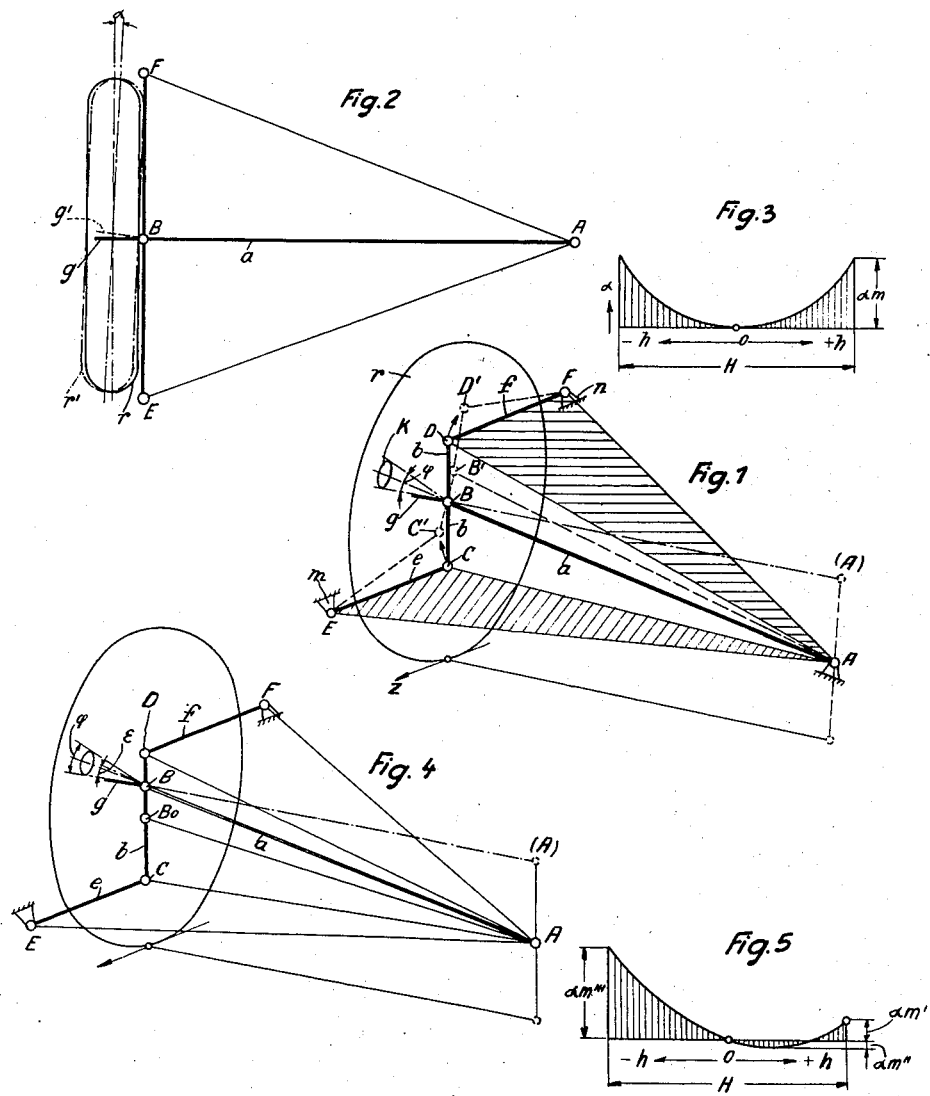

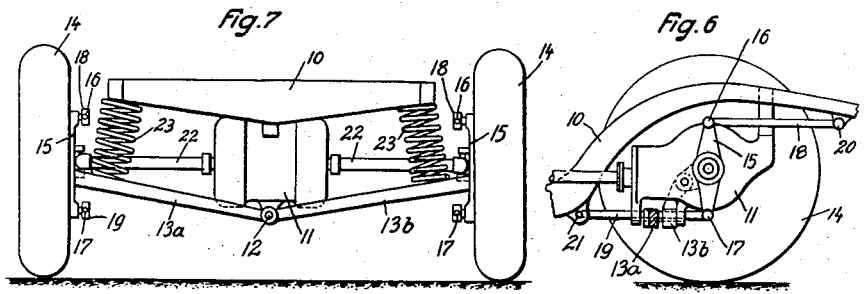
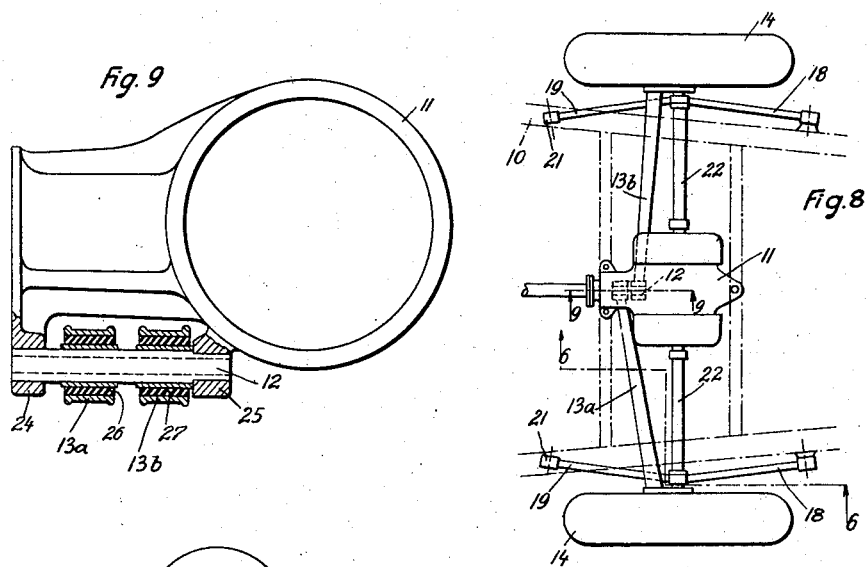
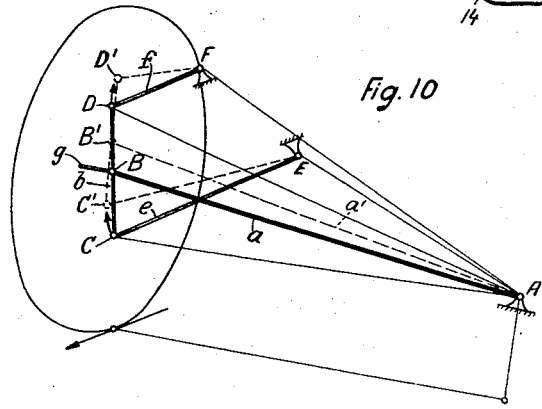

2,811,214

INDIVIDUAL SUSPENSION FOR REAR DRIVE WHEELS

Rudolf E. Uhlenhaut, Stuttgart, and Ludwig Kraus, Stuttgart-Unterturkheim, Germany, assignors to Daimler-Benz Aktiengesellschaft, Stuttgart-Unterturkheim, Germany Application May 24, 1955, Serial No. 510,726

Claims priority, application Germany May 24, 1954

8 Claims. (Cl. 180—73)

The present invention relates to a wheel suspension, particularly for motor-driven vehicles. It is an object of the invention to provide a simple, easy and correct guidance of the wheel by means of transmitting the forces from the wheel to the vehicle body in a favorable manner.

More specfically the invention relates to that type of wheel suspension which includes a swinging half axle and a plurality of radius rods for stabilizing the same lengthwise of the car, and it is the object of the invention to so arrange such radius rods that variations of the toe-in angle, i. e. the angle included between the axis of the wheel and a transverse vertical plane of the vehicle, that occur coincidentally to the springing movement of the wheel are restricted to a minimum.

Further objects of the invention will appear from a detailed description of a number of embodiments thereof described hereinafter with reference to the drawings. It is to be understood, however, that such detailed description serves the purpose of ilustrating the invention rather than that of limiting or restricting the same. In the drawings Fig. 1 is a diagrammatic perspective view of a wheel suspension embodying the invention, such suspension incorporating a half axle linked to the body of the vehicle at a point spaced from and located below the wheel axis, the wheel carrier being guided by a pair of radius rods extending therefrom in opposite directions, Fig. 2 is a plan view of the suspension illustrated in Fig. 1, the variations of the toe-in angle α being indicated by a representation of the different relative positions of the wheel in full lines and in dotted lines, Fig. 3 is a graph illustrating the variation of the toe-in angle as a function of the up and down movement of the wheel relative to the body obtained with the arrangement according to Figure 1, Fig. 4 is a diagrammatic perspective view similar to that of Fig. 1 of a modified suspension in which the radius rods or links are disposed at a lower level with respect to the wheel, Fig. 5 is a graph similar to that of Fig. 3 showing the variation of the toe-in angle as a function of the up and down movement of the wheel relative to the body obtained with the arrangement according to Figure 4, Fig. 6 is a sectional side elevation of the wheel suspension shown in Fig. 5, the section being taken along line 6—6 of Fig. 8, Fig. 7 is a rear view of the wheel suspension shown in Figs. 5 and 6 viewed from the right of Fig. 6, Fig. 8 is a plan view of the suspension illustrated in Figs. 5, 6 and 7, Fig. 9 is a detail of the suspension illustrated in Fig. 6 being shown on an enlarged scale, partly in section along the line 9—9 of Fig. 8, and Fig. 10 is a diagrammatic perspective view of a further modification of the wheel suspension, the view being similar to that of Figs. 1 and 4, this suspension differing from that illustrated in Fig. 1 in that both of the radius links extend in the same general direction.

In the wheel suspension illustrated in Fig. 1 the wheel r is journalled on a stub shaft g which is rigidly connected with the swinging half axle a extending transversely of the car body and pivotally mounted thereon at the pivot point A. The term "car body" as used herein is intended to include the chassis and the elements secured thereto where the chassis is separable from the body proper.

As shown in Fig. 1, the pivot point A is spaced from the geometrical axis B—(A) of the wheel and the stub shaft g and located generally below such axis. A wheel carrier b which is mounted on the member a and forms a rigid unit therewith and with the stub shaft g is braced against lengthwise extending braking and traction forces by a pair of links e and f which are pivotally connected to the wheel carrier b at C and D and extend therefrom in opposite directions. Preferably, the distance A—(A) between the pivot point A and the wheel axis is equal to or larger than the distance B—C. In other words, the distance by which the pivot point C of the lower link e is located below the stub shaft g does not substantially exceed the distance A—(A) between the pivot point A and the axis of the stub shaft g. At E and F means are provided for pivotally connecting the ends of the links e and f to the vehicle body, such means including brackets m and n fixed to the body and provided with universal joints or, alternatively, with hinges, the pivotal axes of such hinges extending through the point A. Similarly, the joints provided at C and D may be either universal joints or hinges, the pivotal axes of which extend through the point A.

Preferably, the level of point F is spaced from the level of point E a distance corresponding to the distance C—D. Preferably, the joints provided at the points C, D, E, and F include rubber bushings.

It will be noted that in the suspension illustrated in Fig. 1 the stub shaft g which extends through the center of the wheel r is equally spaced from the pivot points C and D. When the stub shaft g moves upwardly relative to the body causing the half axle a to swing about the point A, the point C will be guided on an arc of a circle drawn about the line E—A. Similarly, the point D will move along the arc of a circle drawn about the straight line A—F. In this manner C may move to C' while D may move to D'. As a result, the wheel carrier b which connects the links e and f will be caused to perform a motion closely approaching the vertical transverse plane of the vehicle extending through the center of the wheel. Therefore, practically no departure of the wheel from the direction of travel z will be effected, and the stub shaft g will move on a path closely approaching such transverse vertical plane.

The point B positioned at the center between C and D is the turning point for the wheel carrier b which, therefore, swings about the line B—A, the stub shaft g rigidly connected with the wheel carrier performing a motion on a cone k having an apex angle φ. It follows that the maximum upward movement of the stub shaft g relative to the body of the vehicle causes the stub shaft to reach the position g' in Fig. 2 which corresponds to a toe-in angle α of departure of the wheel from the direction of travel.

In Fig. 3 the angle α is shown as a function of the up and down movement h of the stub shaft of Fig. 1. It will appear that the caster angle α increases progressively with the up and down movement h substantially in accordance with a parabola, the neutral normal position of the wheel axis being indicated at O. Where the total up and down movement of the wheel axis relative to the body is composed of equal upward and downward displacement of the wheel axis, both end positions of the wheel axis will result in the same maximum toe-in angle α.

It is an object of the invention to reduce this angle to a minimum. In Fig. 4 an embodiment of the invention is illustrated in which this object is attained by a reduction of the distance B—D. In other words, the stub shaft g is no longer disposed at the center Bo but thereabove at B. This object may be attained by disposing the joints E and F on the body at a lower level thereof than shown in Fig. 1. Otherwise the embodiment shown in Fig. 4 is similar to that of Fig. 1; more particularly, the rule that the distance between B and C shall not substantially exceed the distance A—(A) applies equally to this embodiment. As a result of the relocation of B with respect to C and D, the wheel carrier b and the stub shaft g rigidly connected therewith will no longer swing about the line A—B but will swing about the line A—Bo which includes with the horizontal, or with the stub shaft respectively, a smaller angle only, to wit half the cone apex angle $$\frac{\epsilon}{2}$$

in lieu of half the cone angle $$\frac{\varphi}{2}$$

whereby the toe-in angle will be reduced accordingly.

In Fig. 5 the toe-in angle is represented as a function of the up and down movement $h$ of the wheel axis in Figure 4 relative to the body of the vehicle, the upward movement from the neutral position being designated $+h$ and the downward movement of the vehicle from the central zero position being denoted by $-h$. By suitably dimensioning the swinging half axle $a$ and the links $e$ and $f$ and by suitably locating the wheel center and the joints E and F of the links relative to the body and to one another, such an organization of the elements may be attained that upward movement of the wheel relative to the body results in an extremely small maximum toe-in angle $\alpha m'$ in one direction or $\alpha m''$ in the other direction. Moreover, $\alpha m'$ may be substantially equal to $\alpha m''$. While downward movement of the wheel results in a somewhat larger toe-in angle $\alpha m'''$, such angle may be readily kept within small limits of from 15 to 20 minutes and may thus be kept within the limits of the allowance with which the various elements are machined. Moreover, the somewhat larger toe-in angle $\alpha m'''$ does no harm because the wheel will be subjected to a reduced load coincidentally to the occurrence of such departure from the direction of travel. The toe-in angle occurring coincidentally to the upward movement of the wheel may be limited to 2 to 3 minutes.

In Figs. 6, 7, 8 and 9 the suspension diagrammatically shown in Fig. 4 is illustrated. In contrast to the showing in Fig. 4, however, the joints between the half axles and the body and the points of connection of the half axles with the wheel carriers are spaced from the transverse central vertical plane of the wheels.

The body of the vehicle includes a chassis 10 and a differential gear 11 mounted thereon. Preferably, resilient cushions are interposed therebetween. At the bottom of the housing means are provided for pivotally mounting the axle members 13a and 13b, such means including a common pivot pin 12 extending lengthwise of the vehicle. The pivotal axle members 13a and 13b which extend generally transversely to the vehicle are rigidly connected with the wheel carriers 15 on which the wheels 14 are journalled by means of the customary stub shaft. A pair of links 18 and 19 is pivotally connected by joints 16 and 17 to each wheel carrier 15 extending therefrom in opposite directions. Means 20 and 21 are provided for pivotally connecting the ends of the links 18 and 19 to the chassis 10. It will be noted that the upper link 18 extends rearwardly from the wheel carrier and that the lower link 19 extends forwardly from the wheel carrier. The connecting means 20 and 21 are vertically spaced a distance equalling substantially the vertical length of the wheel carrier 15. A driving shaft 22 extends from the differential housing 11 to the associated wheel 14 to drive the same. The driving shafts 22 are provided with universal joints. Helical springs 23 are inserted between the chassis 10 and the axle members 13a and 13b for springing the same.

As will appear from Figs. 6, 8 and 9, the pin 12 is mounted in eyes 24 and 25 extending from the differential housing 11, and the axle members 13a and 13b are mounted pivotally on the pin 12 by means of resilient bushings 26 and 27 which may consist of rubber and may be armed with inner sleeves bonded to the rubber. The rubber sleeves 26 and 27 permit the axle members 13a and 13b to freely perform the movements prescribed by the links 18 and 19. In so doing the axle members in addition to swinging up and down may also slightly swing forwardly or rearwardly through the angles $\alpha m'$, $\alpha m''$, and $\alpha m'''$ shown in Fig. 5.

The joints 16, 17, 20 and 21 may be either spherical joints or hinges. In the latter alternative the axes of the hinges preferably extend through the associated rubber sleeve 26, or 27 respectively, and the hinges may be provided with the rubber sleeves.

The embodiment illustrated in Fig. 10 differs from those previously described by the links $e$ and $f$ extending in the same general longitudinal direction so that the pivotal axes A—E and A—F about which the joints C and D turn along arcuate circles are disposed on the same side of the center B of the wheel or of the axle member $a$ which extends transversely of the vehicle body. It will be noted that the upper link $f$ is shorter than the lower link $e$. The vertical distance of the points E and F may equal the vertical length of the wheel carrier $b$, i. e. the distance C—D. Under normal load imposed on the vehicle, the points E and F may be located at a slightly higher level than the points C and D, when the vehicle is at rest.

Owing to a proper dimension of the links $e$ and $f$ and to a proper location of point A of the axle member, the displacement of the point B in the direction of travel will compensate the inclination of the wheel carrier $b$ in the direction C'—D' which would again produce a turning movement of the stub shaft $g$ on a cone.

From the foregoing explanations it will be understood that each wheel is guided by means of a member acting as a swinging half axle and by means of two lengthwise extending link members which brace the swinging half axle in longitudinal direction. Each of the three members is preferably universally linked to the chassis, while the two lengthwise extending link members are universally linked to the wheel carrier. The universal connections may be provided by rubber joints or other universal joints. The longitudinal link members may extend in opposite directions or in the same general direction from the wheel carrier which is rigidly connected with the swinging half axle member and are preferably connected to both the wheel carrier and the chassis by means permitting of a universal movement. When the link members extend in opposite directions, the upper member is preferably directed rearwardly and the lower member forwardly so that they may be subjected to a tensional stress when a braking couple is applied to the wheel.

As a result, the wheels are guided independently from each other, each wheel being guided by three members including the swinging half axle and the two links. As a result, the forces acting on the wheel are transferred by the longitudinal links directly to the body of the vehicle. All three guiding members may be formed by simple rods of reduced weight, particularly where the longitudinal links are subjected to tensional stresses only when the brakes are applied.

It offers particular advantages to mount the swinging half axle braced against the body by longitudinal link members in a joint disposed at a low level, such joint permitting of a universal movement and being disposed either on the chassis or on the axle transmissions mounted thereon. By this arrangement the couples are reduced which result from lateral forces occurring in the joint of the swinging half axle and tend to tilt the wheel outwardly.

In order to reduce departures of the wheel from the direction of travel and undesirable toe-in angles of the wheel occurring coincidentally to the springing movement, the pivots between the longitudinal links and the wheel carrier rigidly connected with the swinging half axle and constituting a connecting link between the longitudinal links are preferably so disposed that the upper link has a lesser distance from the stub shaft than has the lower link. As a result, movements of the stub shaft on a cone the axis of which is determined by the joint of the swinging half axle on the one hand and by the center of the wheel carrier on the other hand may be made so small as to be practically negligible.

If desired, however, the pivot points may be so disposed that the variations of the toe-in angle coincidental to an upward movement of the wheel relative to the body will be smaller than the variation of the toe-in angle occurring coincidentally to a downward movement of the wheel. More particularly, the arrangement may be so made that on upward movement of the wheel, that is to say during periods of a powerful load acting on the wheel, the departure of the wheel from the direction of travel will be nearly zero throughout the entire travel of the wheel. The larger departure of the wheel during the downward springing movement thereof has little influence only on the road-hugging property of the vehicle because during its downward springing movement the wheel is subjected to a reduced load and, therefore, will not produce any undesirable forces. Where both of the swinging half axles on opposite sides of the vehicle are mounted on a common pivot extending lengthwise of the vehicle, or where the springing half axles will cross each other, a great length of the swinging half axles is obtained at the same time which has the advantage that the inclination of the wheel will be subject to small variations only, particularly where the pivot of the half axles is disposed at a low level.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. A wheel suspension for vehicles comprising an axle member pivotally mounted to the vehicle superstructure at a pivot point, a wheel carrier spaced from said pivot point in a direction extending generally transversely to the vehicle, said wheel carrier being rigidly connected to said axle member so that said wheel carrier swings in unison with said axle member about said pivot point, a pair of links pivotally connected to said wheel carrier and extending therefrom in opposite directions, means for pivotally connecting the ends of said links to the vehicle body, a wheel-carrying stub shaft rigidly connected with said wheel carrier and extending through the wheel center, said pivot point being located below the axis of said stub shaft.

2. A pair of wheel suspensions as claimed in claim 1 for a pair of opposite wheels in which said axle member of each of said suspensions has a length exceeding the distance of said wheel carrier from the central vertical longitudinal plane of the vehicle whereby the pivot point of one of said axle members will be laterally spaced from said pivot point of the other one of said axle members, said axle members crossing each other.

3. A wheel suspension as claimed in claim 1 in which said car body includes an axle drive housing, said suspension additionally comprising means provided at the bottom of said housing for pivotally mounting said axle member, and a driving shaft extending from said axle drive housing to said wheel.

4. A wheel suspension for vehicles comprising an axle member pivotally mounted to the vehicle superstructure at a pivot point, a wheel carrier mounted on said member, a pair of links pivotally connected to said wheel carrier and extending therefrom in opposite directions, means for pivotally connecting the ends of said links to the vehicle body, a wheel-carrying stub shaft rigidly connected with said wheel carrier and extending through the wheel center, said pivot point being located below the axis of said stub shaft, said pair of links comprising an upper link pivotally connected to said wheel carrier at a point located above said stub shaft and a lower link pivotally connected to said wheel carrier at a point located below said stub shaft and spaced therefrom a larger distance than the distance of said upper link from said stub shaft, said links being so arranged and connected with said wheel carrier that the axis about which said stub shaft turns coincidentally to a springing movement of the wheels because of the rocking movement of said links is less inclined to the floor plane than the straight line connecting said pivot point with said wheel center.

5. A wheel suspension as claimed in claim 4 in which said wheel carrier is rigidly mounted on said axle member.

6. A wheel suspension as claimed in claim 4 in which said pair of links comprises a lower link extending from said wheel carrier in forward direction and an upper link extending from said upper link in rearward direction whereby braking of the wheel journalled on said wheel carrier will subject said links to tensional stresses.

7. The combination claimed in claim 4 in which said means for pivotally connecting the ends of said links to the vehicle body include rubber bushings.

8. A wheel suspension for vehicles comprising an axle member pivotally mounted to the vehicle superstructure of a pivot point, a wheel carrier mounted on said member, a pair of links pivotally connected to said wheel carrier and extending therefrom in opposite directions, means for pivotally connecting the ends of said links to the vehicle body, a wheel-carrying stub shaft rigidly connected with said wheel carrier and extending through the wheel center, said pivot point being located below the axis of said stub shaft, said pair of links comprising an upper link pivotally connected to said wheel carrier at a point located above said stub shaft and a lower link pivotally connected to said wheel carrier at a point located below said stub shaft and spaced therefrom a larger distance than said upper link, said distance not exceeding substantially the distance between said pivot point and said axis of said stub shaft.

References Cited in the file of this patent

UNITED STATES PATENTS

| | | |
|---|---|---|
| 1,404,585 | De Coninck | Jan. 24, 1922 |
| 2,242,030 | Hicks | May 13, 1941 |
| 2,266,280 | Sherman | Dec. 16, 1941 |
| 2,580,557 | Kolbe | June 1, 1952 |

FOREIGN PATENTS

| | | |
|---|---|---|
| 602,509 | France | Dec. 28, 1925 |
| 764,339 | Germany | June 15, 1953 |